United States Patent
Alkalay et al.

(10) Patent No.: US 12,386,738 B1
(45) Date of Patent: Aug. 12, 2025

(54) PROVIDING ENDURANCE TO SOLID STATE DEVICE STORAGE

(71) Applicant: Dell Products L.P., Round Rock, TX (US)

(72) Inventors: Amitai Alkalay, Kadima (IL); Amihay Azruel, Raanana (IL); Lior Kamran, Richon LeZion (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/606,027

(22) Filed: Mar. 15, 2024

(51) Int. Cl.
G06F 12/02 (2006.01)

(52) U.S. Cl.
CPC .. *G06F 12/0246* (2013.01); *G06F 2212/7205* (2013.01)

(58) Field of Classification Search
CPC ............... G06F 12/0246; G06F 2212/7205
See application file for complete search history.

(56) References Cited

U.S. PATENT DOCUMENTS

| | | | |
|---|---|---|---|
| 9,218,284 B2 | 12/2015 | Yoon et al. | |
| 10,564,864 B1 * | 2/2020 | Ha | G06F 3/0617 |
| 10,810,132 B1 | 10/2020 | Gaasbeck | |
| 10,916,292 B1 * | 2/2021 | Zhou | G11C 11/40611 |
| 11,500,584 B2 * | 11/2022 | Masuo | G06F 3/0616 |
| 11,995,329 B1 | 5/2024 | Kamran et al. | |
| 2015/0248873 A1 * | 9/2015 | Tanaka | G09G 3/3648 345/99 |
| 2017/0269873 A1 * | 9/2017 | Tan | G06F 3/0688 |
| 2018/0260134 A1 * | 9/2018 | Li | G11C 11/5628 |
| 2019/0034114 A1 * | 1/2019 | Natarajan | G06F 3/0619 |
| 2019/0221273 A1 * | 7/2019 | Parkinson | G06F 12/0246 |
| 2021/0157722 A1 * | 5/2021 | Jang | G06F 11/3419 |
| 2021/0303196 A1 | 9/2021 | Lv et al. | |
| 2022/0261184 A1 * | 8/2022 | Mylavarapu | G06F 3/0644 |
| 2023/0214115 A1 | 7/2023 | Lee et al. | |
| 2023/0297502 A1 * | 9/2023 | Um | G06F 3/0652 |
| 2024/0054971 A1 | 2/2024 | Cariello | |

* cited by examiner

*Primary Examiner* — Tasnima Matin
(74) *Attorney, Agent, or Firm* — BainwoodHuang

(57) ABSTRACT

A technique is directed to providing endurance to solid state device (SSD) storage. The technique involves storing data in an erase block of the SSD storage. The technique further involves detecting that an internal periodic refresh service operating within the SSD storage is currently configured to perform a refresh operation for the erase block at a target refresh time that is within an upcoming amount of time. The technique further involves, in response to detecting that the internal periodic refresh service is currently configured to perform a refresh operation for the erase block at the target refresh time that is within the upcoming amount of time, performing a system-level garbage collection operation on the data stored in the erase block to prevent the internal periodic refresh service from performing a refresh operation for the erase block at the target refresh time.

19 Claims, 8 Drawing Sheets

PROVIDING ENDURANCE TO SOLID STATE DEVICE STORAGE

BACKGROUND

A conventional data storage system includes storage processors and storage drives. The storage processors perform input/output (I/O) operations to store data within the storage drives and read data from the storage drives on behalf of one or more host computers.

Quad-level cell (QLC) solid state devices (SSDs) are commonly used as data storage system storage drives. QLC SSDs offer greater capacity and tend to be less expensive (e.g., lower cost per gigabyte) compared to other types of storage drives such as triple-level cell (TLC) SSDs.

SUMMARY

Unfortunately, there are deficiencies to a conventional data storage system which uses QLC SSDs. Along these lines, QLC SSDs tend to have relatively poor durability (i.e., QLC SSDs are less durable than TLC SSDs). For example, QLC SSDs require frequent internal refreshes in which data is internally read from one erase block and written to another erase block at refresh intervals in order to prevent data loss due to weakened cell charge.

Improved techniques involve system-level garbage collecting data from erase blocks of SSD storage just before the erase blocks are to be internally refreshed. Such operation alleviates the need to internally refresh the erase blocks thus improving SSD storage endurance. Additionally, such operation simultaneously accomplishes system-level garbage collection (e.g., consolidating valid data into fewer erase blocks) thus improving storage efficiency and making erase blocks of the SSD storage available for future use. Flexible data placement (FDP) SSDs are well suited for forming the SSD storage since FDP SSDs support a rich and robust command set which provides external storage processing circuitry with the ability to identify (or specify) reclaim units (RUs) in which to write to using reclaim unit handles (RUHs).

One embodiment is directed to a method of providing endurance to SSD storage which includes storing data in an erase block of the SSD storage. The method further includes detecting that an internal periodic refresh service operating within the SSD storage is currently configured to perform a refresh operation for the erase block at a target refresh time that is within an upcoming amount of time. The method further includes, in response to detecting that the internal periodic refresh service is currently configured to perform a refresh operation for the erase block at the target refresh time that is within the upcoming amount of time, performing a system-level garbage collection operation on the data stored in the erase block to prevent the internal periodic refresh service from performing a refresh operation for the erase block at the target refresh time.

Another embodiment is directed to data storage equipment which includes SSD storage, control circuitry memory, and control circuitry coupled to the SSD storage and the control circuitry memory. The control circuitry memory stores instructions which, when carried out by the control circuitry, cause the control circuitry to perform a method of:

(A) storing data in an erase block of the SSD storage,
(B) detecting that an internal periodic refresh service operating within the SSD storage is currently configured to perform a refresh operation for the erase block at a target refresh time that is within an upcoming amount of time, and
(C) in response to detecting that the internal periodic refresh service is currently configured to perform a refresh operation for the erase block at the target refresh time that is within the upcoming amount of time, performing a system-level garbage collection operation on the data stored in the erase block to prevent the internal periodic refresh service from performing a refresh operation for the erase block at the target refresh time.

Yet another embodiment is directed to a computer program product having a non-transitory computer readable medium which stores a set of instructions to provide endurance to SSD storage. The set of instructions, when carried out by computerized circuitry, causes the computerized circuitry to perform a method of:

(A) storing data in an erase block of the SSD storage;
(B) detecting that an internal periodic refresh service operating within the SSD storage is currently configured to perform a refresh operation for the erase block at a target refresh time that is within an upcoming amount of time; and
(C) in response to detecting that the internal periodic refresh service is currently configured to perform a refresh operation for the erase block at the target refresh time that is within the upcoming amount of time, performing a system-level garbage collection operation on the data stored in the erase block to prevent the internal periodic refresh service from performing a refresh operation for the erase block at the target refresh time.

In some arrangements, storing the data in the erase block includes writing the data from storage processing circuitry which is external to the SSD storage into an UBER slice which maps to the erase block of the SSD storage.

In some arrangements, the internal periodic refresh service is configured to periodically perform refresh operations for erase blocks of the SSD storage according to a predefined refresh interval. Additionally, detecting that the internal periodic refresh service is currently configured to perform a refresh operation for the erase block at the target refresh time that is within the upcoming amount of time includes:

(i) computing a time difference between a time in which the erase block was last written and a current time, and
(ii) based on the time difference and the predefined refresh interval, detecting that an amount of time remaining in a current refresh interval before the target refresh time is less than a predefined threshold.

In some arrangements, performing the system-level garbage collection operation on the data includes emptying the data from the UBER slice before the amount of time remaining in the current refresh interval passes to reconfigure the internal periodic refresh service to avoid performing a refresh operation for the erase block at the target refresh time.

In some arrangements, emptying the data from the UBER slice before the amount of time remaining in the current refresh interval passes includes providing a set of commands from the storage processing circuitry to the SSD storage to relocate the data from the erase block of the SSD storage to one or more other erase blocks of the SSD storage.

In some arrangements, emptying the data from the UBER slice before the amount of time remaining in the current refresh interval passes further includes deallocating logical block addresses (LBAs) associated with the UBER slice to unmap the UBER slice, and mapping one or more other UBER slices which map to the one or more other erase blocks to enable the storage processing circuitry to maintain access to the data that has been relocated to the one or more other erase blocks (e.g., mapping may be achieved naturally via writing to address ranges with the same RU handles).

In some arrangements, the storage processing circuitry is constructed and arranged to manage a garbage collection list having slice entries corresponding to UBER slices. Additionally, the method further includes recording a timestamp in a slice entry of the garbage collection list in response to writing the data from storage processing circuitry into the UBER slice which is currently mapped to the erase block of the SSD storage, the slice entry corresponding to the UBER slice.

In some arrangements, detecting that the internal periodic refresh service is currently configured to perform a refresh operation for the erase block at the target refresh time that is within the upcoming amount of time includes:
  (i) computing, as a time-to-next-refresh value for the slice entry of the garbage collection list, a time difference between the timestamp in the slice entry of the garbage collection list and the target refresh time, and
  (ii) detecting that the time-to-next-refresh value is less than a predefined threshold.

In some arrangements, performing the system-level garbage collection operation on the data stored in the erase block includes initiating the system-level garbage collection operation in response to detecting that the time-to-next-refresh value is less than the predefined threshold.

In some arrangements, a system-level garbage collection service provided by the storage processing circuitry is currently running. The system-level garbage collection service is configured to garbage collect UBER slices based on marked slice entries of the garbage collection list. Additionally, initiating the system-level garbage collection operation includes discovering that the time-to-next-refresh value is less than the predefined threshold in response to the system-level garbage collection service accessing the slice entry of the garbage collection list.

In some arrangements, a system-level garbage collection service provided by the storage processing circuitry is initially inactive. The system-level garbage collection service is configured to garbage collect UBER slices based on marked slice entries of the garbage collection list. Additionally, initiating the system-level garbage collection operation includes triggering activation of the system-level garbage collection service in response to the time-to-next-refresh value being less than the predefined threshold.

In some arrangements, the method further includes:
  (i) computing, as time-to-next-refresh values for other slice entries of the garbage collection list, time differences between timestamps in other slice entries of the garbage collection list and other target refresh times, and
  (ii) detecting that at least some of the time-to-next-refresh values are less than the predefined threshold.

In some arrangements, the method further includes initiating other system-level garbage collection operations in response to detecting that at least some of the time-to-next-refresh values are less than the predefined threshold.

In some arrangements, a system-level garbage collection service provided by the storage processing circuitry is currently running. The system-level garbage collection service is configured to garbage collect UBER slices based on marked slice entries of the garbage collection list. Additionally, initiating the other system-level garbage collection operation includes discovering that the other time-to-next-refresh values are less than the predefined threshold in response to the system-level garbage collection service accessing the other slice entries of the garbage collection list.

In some arrangements, the storage processing circuitry is constructed and arranged to manage a garbage collection list having slice entries corresponding to UBER slices. Additionally, the method further includes periodically updating the garbage collection list to identify UBER slices for garbage collecting.

In some arrangements, the method further includes updating the garbage collection list in response to UBER slices being fully written.

In some arrangements, the method further includes updating the garbage collection list in response to UBER slices being garbage collected and unmapped.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing endurance to SSD storage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to performing system-level garbage collection on erase blocks of solid state device (SSD) storage just before the erase blocks are to be internally refreshed. Such a technique may involve garbage collecting data from UBER slices map to the erase blocks. Such operation alleviates the need to internally refresh the erase blocks thus improving SSD storage endurance. Additionally, such operation simultaneously accomplishes system-level garbage collection thus improving storage efficiency and making erase blocks of the SSD storage available for future use. Flexible data placement (FDP) SSDs are well suited for forming the SSD storage since FDP SSDs support a rich and robust command set which provides storage processing circuitry, which is external to the SSD storage, with the ability to identify (or specify) reclaim units (RUs) in which to write to using reclaim unit handles (RUHs).

Figure 1:
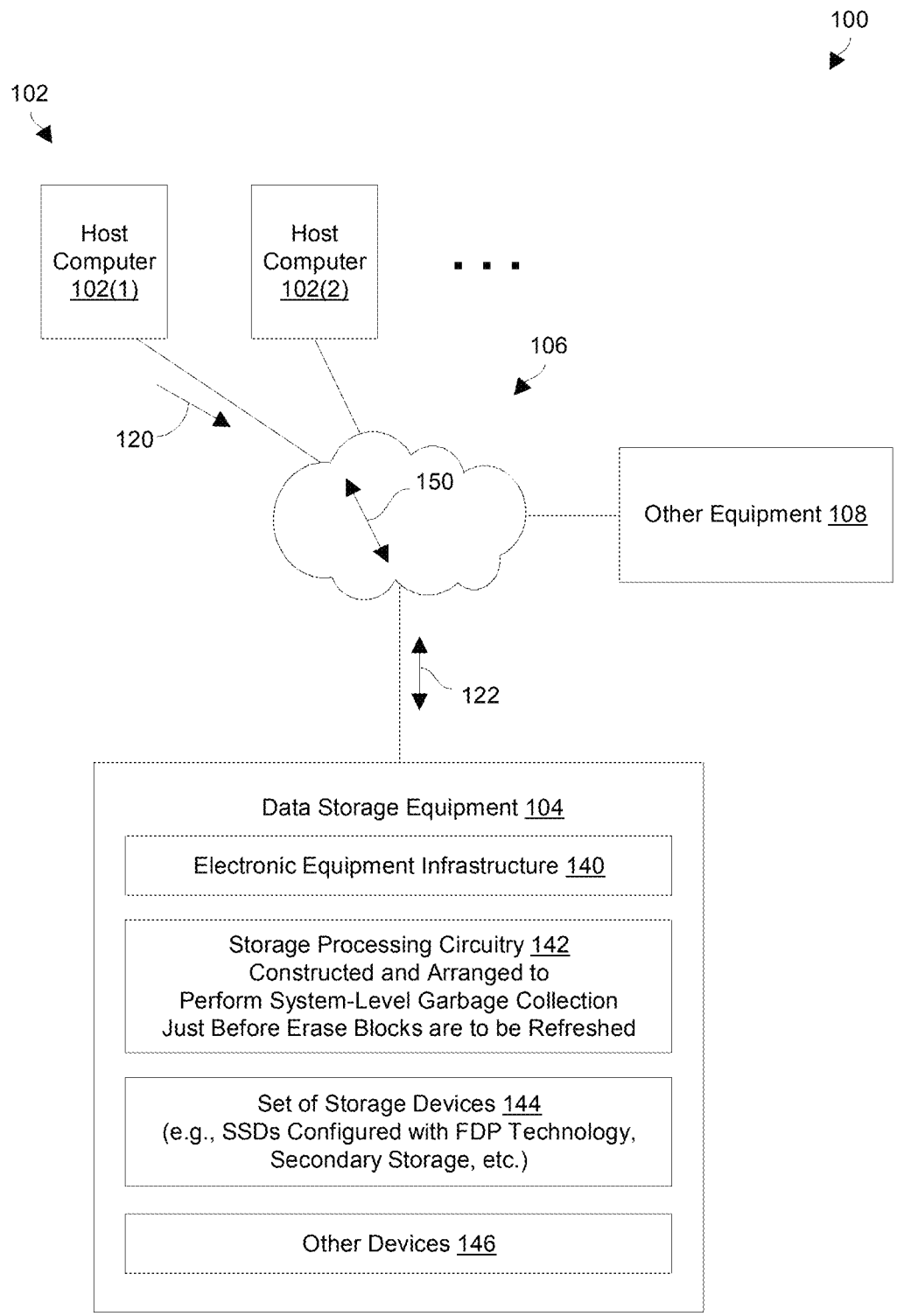
FIG. 1 is a block diagram of a data storage environment which provides endurance to solid state device (SSD) storage in accordance with certain embodiments.

FIG. 1 is a block diagram of a data storage environment 100 which provides endurance to SSD storage in accordance with certain embodiments. The data storage environment 100 includes host computers 102(1), 102(2), . . . (collectively, host computers 102), data storage equipment 104, a communications medium 106, and perhaps other equipment 108.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to store host data 122 within and retrieve host data 122 from storage (e.g., primary storage or main memory, secondary storage, tiered storage, combinations thereof, etc.).

The data storage equipment 104 is an example of electronic equipment that is capable of providing endurance to SSD storage. The data storage equipment 104 includes an electronic equipment infrastructure 140, storage processing circuitry 142, a set of storage devices 144, and other devices 146. Other types of electronic equipment may include one or more of these components and, in accordance with certain embodiments, one or more of the improvements disclosed herein is applied to such other types of electronic equipment (e.g., general purpose computing equipment, database equipment, computational equipment, network equipment, specialize equipment, combinations thereof, etc.).

The electronic equipment infrastructure 140 is constructed and arranged to support operation of various components of the data storage equipment 104. To this end, the electronic equipment infrastructure 140 positions the various components relative to each other, conveys power signals from power converters to the various components, positions fans along air pathways to provide cooling to the various components (i.e., to remove heat), protects the various components against tampering, damage, and so on. Along these lines, the electronic equipment infrastructure 140 may include one or more frames or card cages, chassis/housings/cabinets, power supplies/converters, fans, backplanes or midplanes, and so on.

The storage processing circuitry 142 is constructed and arranged to respond to the host I/O requests 120 received from the host computers 102 by writing data into the set of storage devices 144 and reading the data from the set of storage devices 144. The storage processing circuitry 142 may include one or more physical storage processing modules or engines, data movers, director boards, blades, etc. In accordance with certain embodiments, the storage processing circuitry 142 may include a variety of specialized subcomponents such as processing circuitry to process I/O requests 120 from the host computers 102, cache memory to operate as read and/or write caches, on-board NICs to provide communications between the storage processing circuitry 142 and/or external devices, LEDs, switches for local I/O, and so on.

The set of storage devices 144 is constructed and arranged to store data within the data storage equipment 104. In accordance with certain embodiments, the set of storage devices 44 may arrange the data in accordance with one or more data protection schemes (e.g., RAID1, RAID5, RAID6, RAID10, etc.). Example storage devices 144 include RAM devices, NVRAM devices, other solid state memory devices (SSDs), hard disk drives (HDDs), combinations thereof, and so on.

In accordance with certain embodiments, the storage processing circuitry 142 organizes storage space from the set of storage devices 144 into storage extents called "UBERs." The UBERs include drive sections (or "drive slices") from multiple storage devices 144 according to a particular RAID scheme (e.g., RAID5, RAID6, etc.).

As will be explained in further detail shortly and in accordance with certain embodiments, the set of storage devices 144 includes a set of Flexible Data Placement (FDP) drives (i.e., at least one FDP drive). Such FDP drives are solid state drives that perform internal garbage collection with reclaim unit (RU) granularity to reclaim storage space.

In accordance with certain embodiments, the set of FDP drives provides RUs from which the UBERs are constructed. Such UBERs organize the RUs into log-structured storage in accordance with a storage protection scheme such as RAID5 or RAID6 (e.g., a RAID group or tier of FDP drives). As such, the storage processing circuitry 142 provides an external garbage collection service which is constructed and arranged to, in some situations, clean FDP drives (i.e., relocate the data from the current RUs of those FDP drives) just prior to the FDP drives performing internal refreshes. Such operation reduces (or alleviates the need for) internal refreshes and internal garbage collection performed by the set of FDP drives and, therefore, minimizes write amplification and extends the usefulness of the set of FDP drives.

The other devices 146 of the data storage equipment 104 are constructed and arranged to provide supporting features. Along these lines, the other devices 146 may include a set of communications interfaces (e.g., a set of discrete network interface controllers or NICs) that provide communications for the data storage equipment 104, a user interface for local user access, backup power sources, and so on.

The communications medium 106 is constructed and arranged to connect the various components of the data storage environment 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 108 is capable of supporting LAN-based communications, SAN-based communications, cellular communications, WAN-based communications, distributed infrastructure communications, other topologies, combinations thereof, etc.

The other equipment 108 represents other possible componentry of the data storage environment 100. Along these lines, the other equipment 108 may include remote data storage equipment that provides data to and/or receives data from the data storage equipment 104 (e.g., replication arrays, backup and/or archiving equipment, external service processors and/or other management/control devices, etc.).

During operation, the data storage equipment 104 processes I/O requests 120 from the set of host computers 102 to perform useful work. In particular, the storage processing circuitry 142 writes host data 122 into and retrieves host data 122 from the set of storage devices 144 in response to the I/O requests 120.

During such operation, the storage processing circuitry 142 performs log structured writes on SSD storage. Additionally, the storage processing circuitry 142 performs system-level garbage collection to reclaim unused storage space within the SSD storage (e.g., by consolidating valid data into fewer erase blocks to free up erase blocks for future use).

It should be appreciated that, during such operation, the SSD storage may perform internal operations to manage data as well. Along these lines, the SSD storage may perform internal garbage collection, erase block periodic refreshes at a periodic refresh interval, and so on.

Unfortunately, if left unmanaged or if improperly managed, these internal operations may unnecessarily reduce the lifetime of the SSD storage (e.g., due to periodic refreshes, due to write amplification, combinations thereof, etc.). However, as will be explained in further detail below, the storage processing circuitry 142 may pre-empt internal periodic refreshes of the erase blocks by, at the system level, garbage collecting data from the erase blocks prior to upcoming periodic refresh operations. Such activity alleviates the need to perform the periodic refresh operation and thus extends the lifetime of the SSD storage. Further details will now be provided with reference to FIG. 2.

Figure 2:
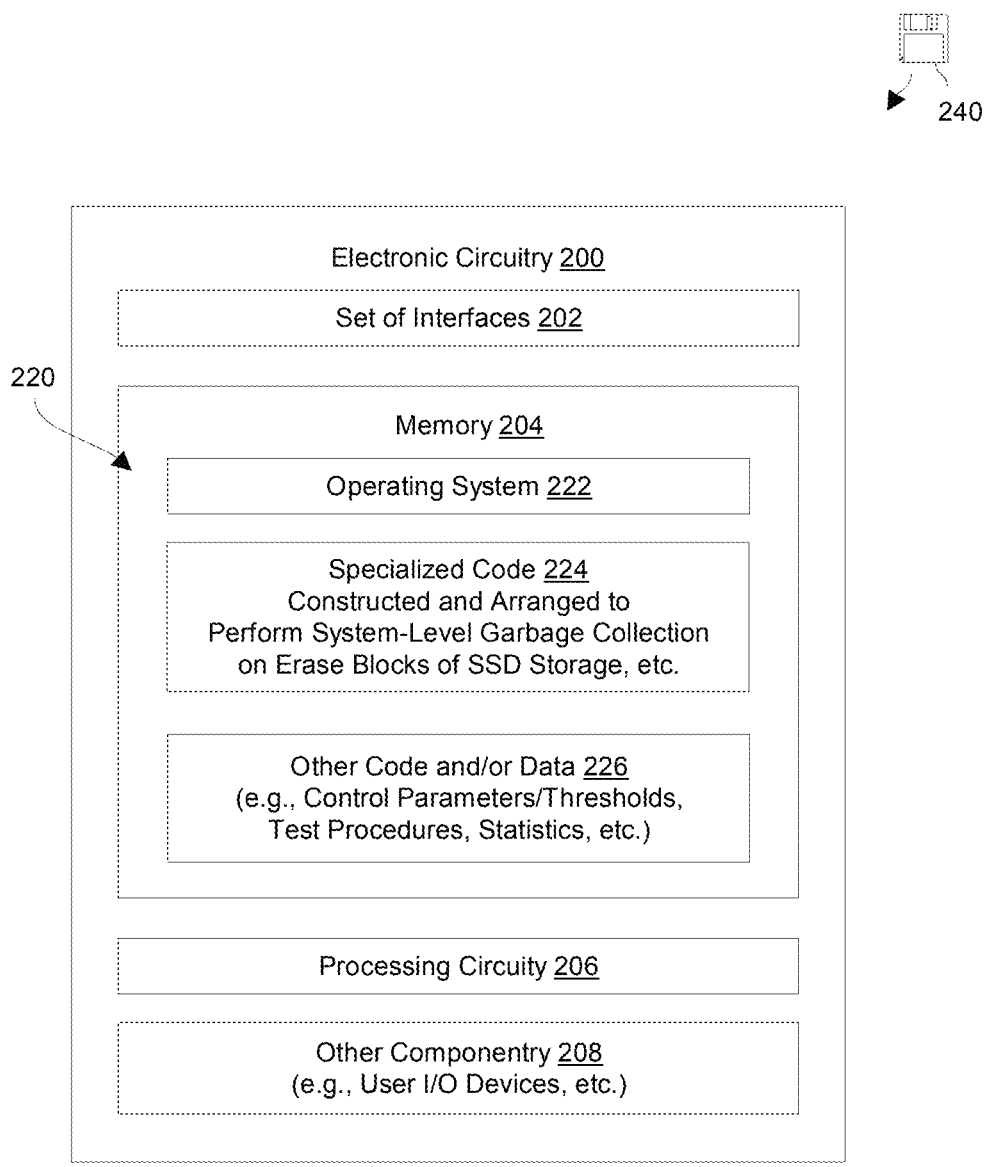
FIG. 2 is a block diagram of data storage equipment of the data storage environment of FIG. 1 in accordance with certain embodiments.

FIG. 2 is a block diagram of electronic circuitry 200 which is suitable for at least a portion of the data storage equipment 104 in accordance with certain embodiments (also see the storage processing circuitry 142 in FIG. 1). The electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 106 (FIG. 1) to enable communications with other devices of the electronic setting 100. Such communications may be IP-based, SAN-based, cellular-based, cable-based, fiber-optic based, wireless, cloud-based, combinations thereof, and so on. Additionally, the set of interfaces 202 is constructed and arranged to connect the electronic circuitry 200 to other local equipment. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions and/or other software constructs for, among other things, performing system-level garbage collection on erase blocks of SSD storage just before the erase blocks are to be internally refreshed. The other code and data 226 refers to control parameters/thresholds, tools, routines, test procedures, statistics, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably enables the electronic circuitry 200 to perform data storage operations as well as provide a system-level garbage collection service. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a local user I/O circuitry, circuitry for fault tolerance, etc. Further details will now be provided with reference to FIGS. 3 through 5.

UBER Details

Figure 3:
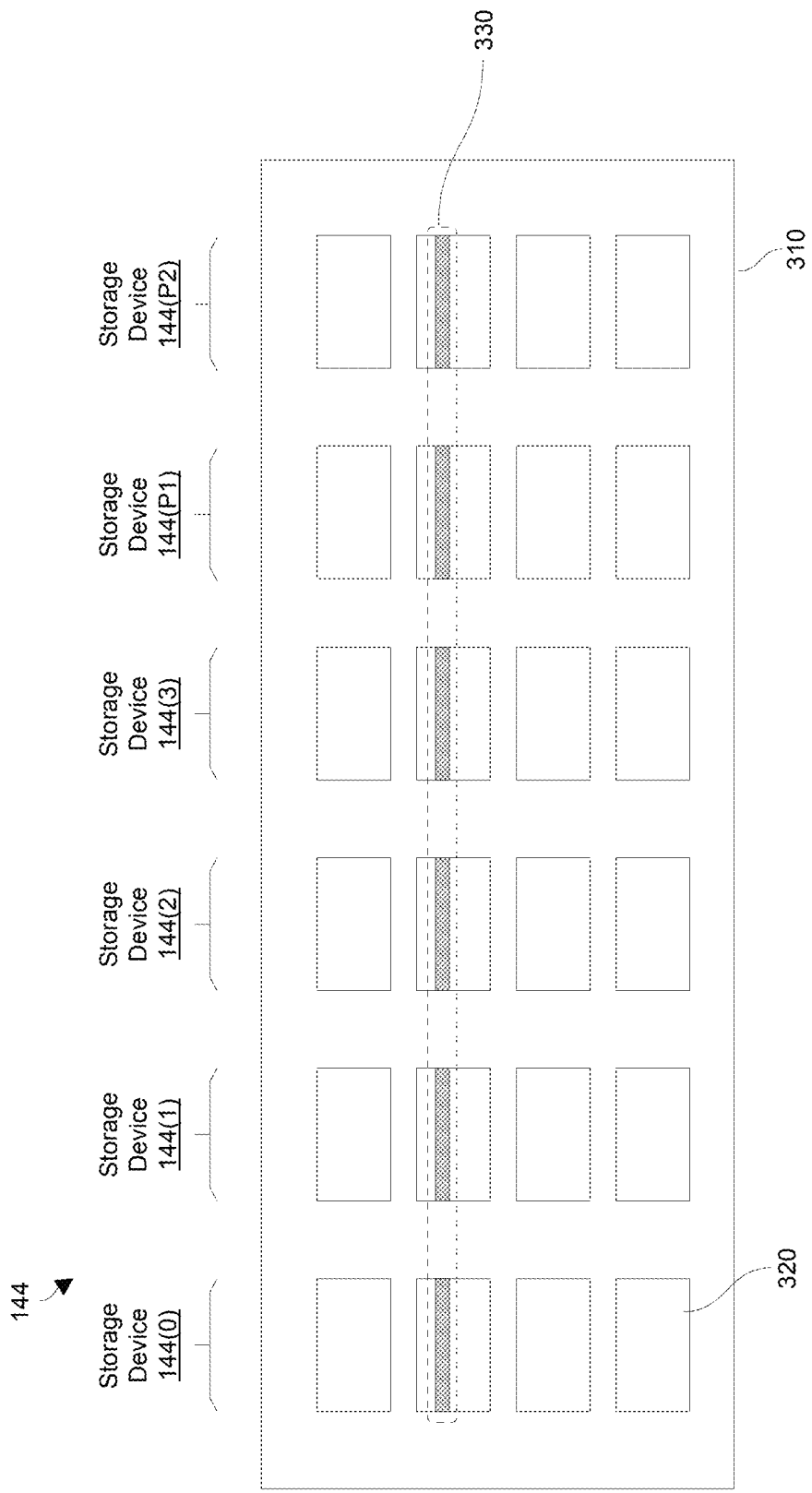
FIG. 3 is a block diagram an example UBER in accordance with certain embodiments.
Figure 4:
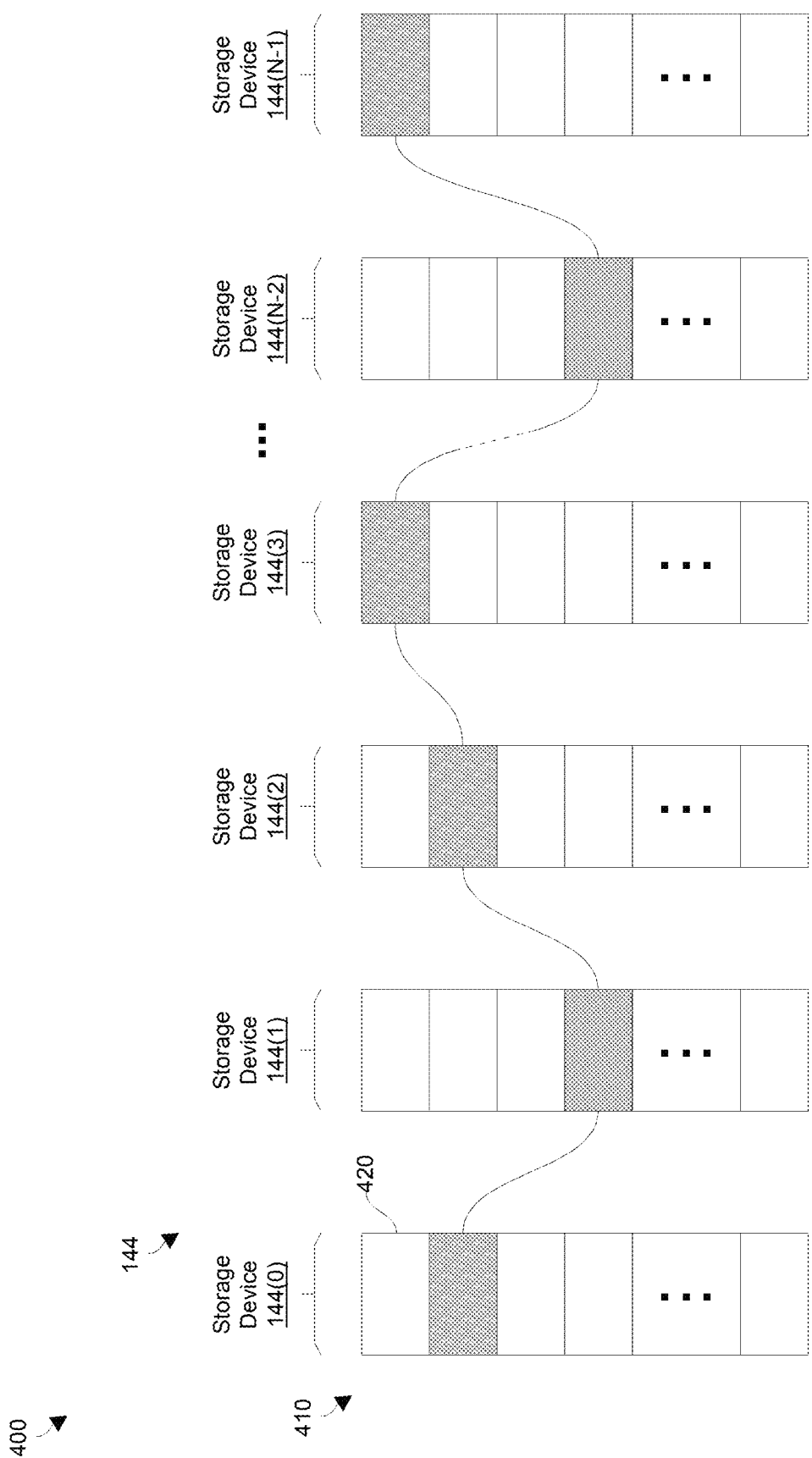
FIG. 4 is a block diagram illustrating how an UBER is constructed in accordance with certain embodiments.
Figure 5:
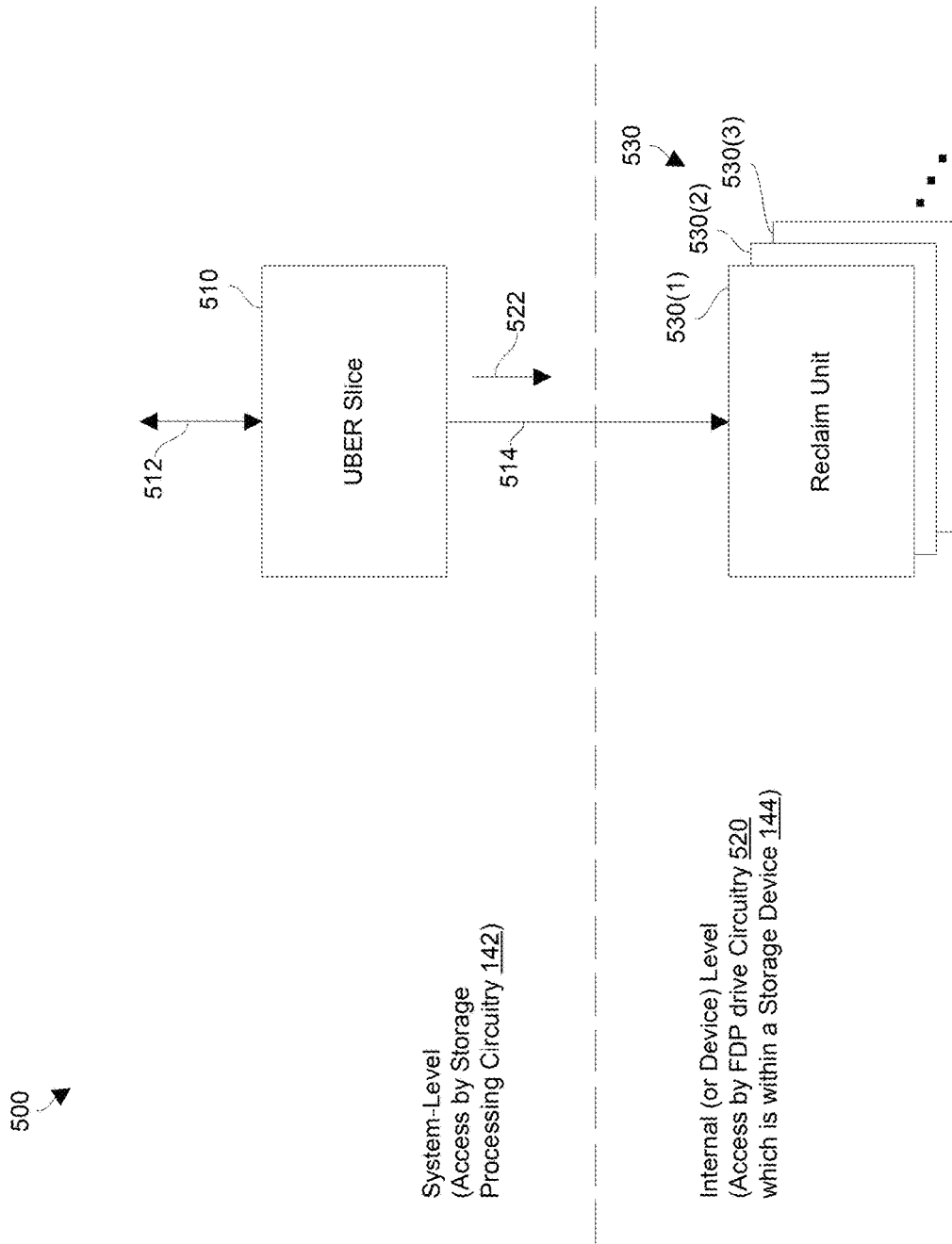
FIG. 5 is a block diagram illustrating certain UBER slice mapping details in accordance with certain embodiments.

FIGS. 3 through 5 provide certain UBER details in accordance with certain embodiments. FIG. 3 shows an example UBER in accordance with the RAID6(4+2) data protection scheme. FIG. 4 shows how an UBER may be created from slices across multiple storage devices 144. FIG. 5 shows certain mapping details regarding an UBER slice.

As shown in the view 300 of FIG. 3, the storage processing circuitry 142 may organize storage space from the set of storage devices 144 into an example UBER 310. In the context of FDP drives, the storage processing circuitry 142 may set the UBER slice size to the FDP RU size, as well as update its system-level garbage collection service to operate at UBER slice granularity. Accordingly, the system-level garbage collection service will empty an entire UBER slice, after which it will erase the empty UBER slice on each of the FDP drives that the UBER slice was constructed from. As a result, the corresponding RUs on each of the FDP drives will get fully erased, such that there is no need for the FDP drives to perform internal garbage collection or periodic refreshes.

It should be appreciated that UBER slices are contiguous ranges of drive LBAs (Logical Block Addresses) within the drives. Accordingly, the mapping of the UBER slices to physical RUs in practice is achieved naturally by writing to address ranges with the same RU handles. Along these lines, as part of write commands to FDP drives, the storage processing circuitry 142 may provide reclaim unit handle identifiers (RUHIs) such that the FDP drives will not mix in the same RU writes with different RU handles. Instead, writes with the same RU handle will be written by an FDP drive to the same physical RU until that physical RU is exhausted (or completely filled), at which point the FDP drive will point the RUH to a new empty RU.

As shown in FIG. 3, the example UBER 310 has a structure in accordance with the RAID6(4+2) data protection scheme. Along these lines, the example UBER 310 includes multiple drive slices 320 from multiple storage devices 144 (also see the set of storage devices 144 in FIG. 1). Additionally, the storage processing circuitry 142 of the data storage equipment 104 may be configured to write data into individual lines 330 of storage referred to as Physical Large Blocks (or PLBs), i.e., storage processing circuitry 142 may be configured to perform log-structured writes of the UBER 310 with PLB granularity.

By way of example, the UBER 310 includes four drive slices 320 from four storage devices 144 for data, and two drive slices 320 from two other storage devices 144 for parity for RAID6(4+2) protection. Accordingly, data stored within the UBER 310 will remain available even after two storage device failures.

In a particular use case, each drive slice 320 is 4 GB in size. Accordingly, the UBER 310 provides 64 GB of storage capacity for user data (4 drive slices of 4 GB×4 data drives=4×4×4=64 GB of user data), and the total UBER capacity is 96 GB (including two parity storage devices 144 each providing four drive slices 320).

It should be understood that other RAID protection schemes and/or other structures for an UBER are suitable for use. For example, a similar structure to that shown in FIG. 3 but without the storage device 144(P2) is suitable for forming an UBER that provides RAID5(4+1) protection, and so on.

As shown in the view 400 of FIG. 4, an UBER 410 is created from at least one drive slice 410 (shaded regions) from each of N storage devices 144 (e.g., storage devices 144(0) through 144(N−1)) to safeguard data in accordance with a RAID protection scheme (e.g., RAID5, RAID6, etc.). It should be understood that just one drive slice 420 from each storage device 144 is shown as forming the UBER 410, but that the UBER 410 may be formed by multiple drive slices 420 from each storage device 144 (e.g., also see FIG. 1). Moreover, the particular drive slices 420 forming the RAID extent are shown in a staggered (or unaligned) arrangement to illustrate that the drive slices 420 may rely on address mapping thus alleviating the need for address alignment across the storage devices 144.

Additionally, other UBERs 410 of the same size may be created by at least one other drive slice 420 from each of the N storage devices 144, and so on. In some arrangements, the UBERs 410 are formed using a mapped RAID architecture in which N-wide RAID extents are formed from more than N storage devices 144. For example, a RAID5(4+1) extent may be formed from five drive extents belonging to five different storage devices 144 from an array (or pool) of 16 storage devices 144.

FIG. 5 is a view 500 of certain mapping details regarding an UBER slice 510 in accordance with certain embodiments. The UBER slice 510 is managed at the system level by the storage processing circuitry 142 of the data storage equipment 104. Along these lines, the storage processing circuitry 142 is able to construct UBERs from UBER slices 510 of multiple storage devices 144 according to a particular RAID scheme such as RAID5 or RAID6 (also see the UBER 310 in FIG. 3 and the UBER 410 in FIG. 4). Accordingly, the storage processing circuitry 142 provides UBER slice access 512 (e.g., access to higher layers in the I/O stack) via mappings 514 to erase blocks within SSD storage (e.g., one or more RUs within one or more FDP drives).

Additionally, the SSD storage which provides the underlying storage space for the UBER slice 510 may be a storage device 144 which performs internal garbage collection and periodic refreshes (e.g., a QLC SSD). In certain embodiments, the storage device 144 is an FDP drive which includes internal FDP drive circuitry 520 that responds to commands 522 from the storage processing circuitry 142. Here, the storage processing circuitry 142 is able to identify storage via RUHIs, which the FDP drive maps to RU handles, to write to particular RUs 530(1), 530(2), 530(3), . . . (collectively, RUs 530) of the FDP drive. As shown by the dashed line, the storage processing circuitry 142 is external to the storage device 144.

It should be appreciated that the FDP drive is constructed and arranged to periodically refresh and garbage collect the RUs 530 containing valid data to prevent data loss. Unfortunately, if left unmanaged or if poorly managed, the FDP drive will inefficiently perform such refreshing/garbage collecting and thus unnecessarily reduce the endurance of the FDP drive. Further details will now be provided with reference to FIG. 6.

Garbage Collection

Figure 6:
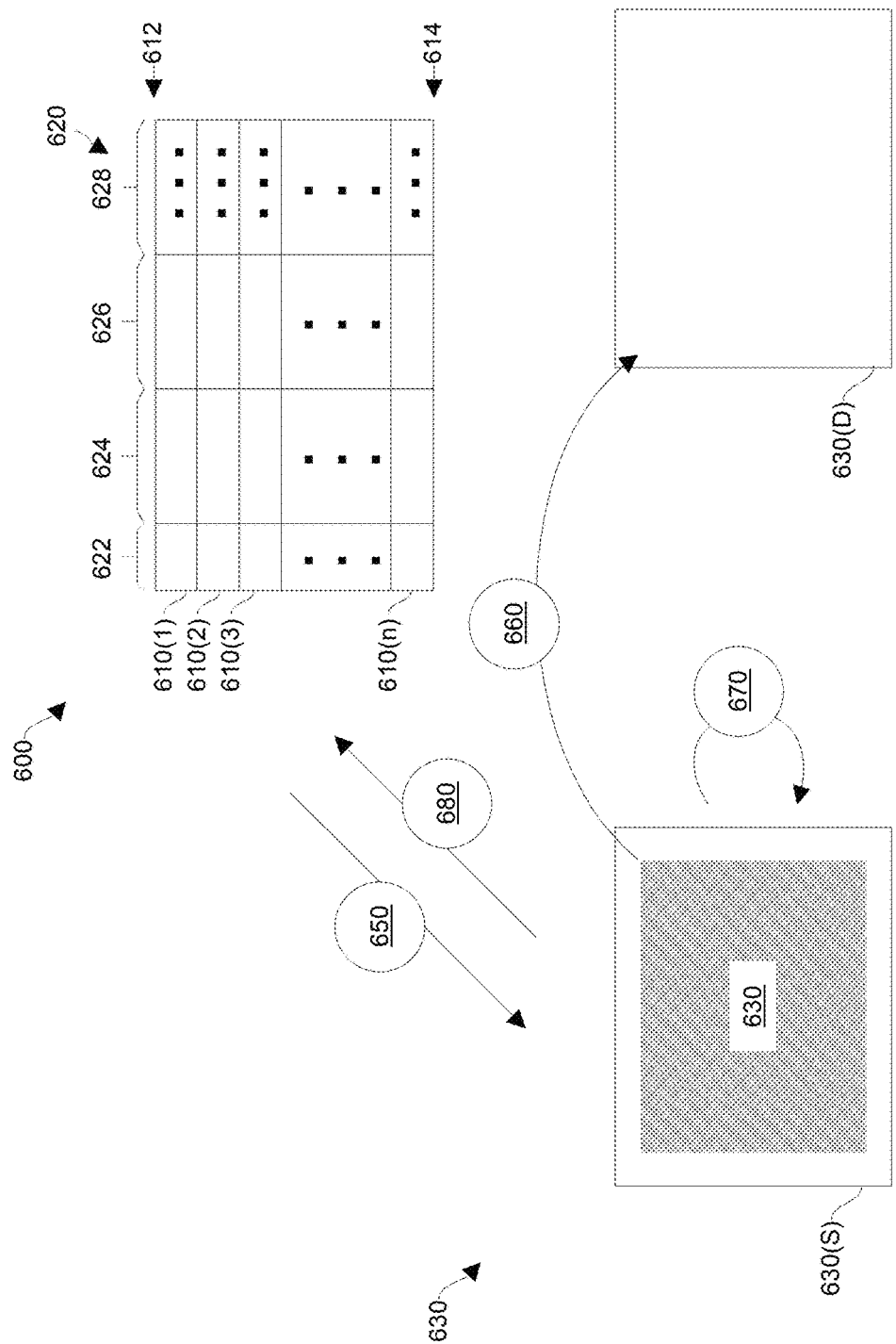
FIG. 6 is a block diagram illustrating involvement of a garbage collection list in accordance with certain embodiments.
Figure 7:
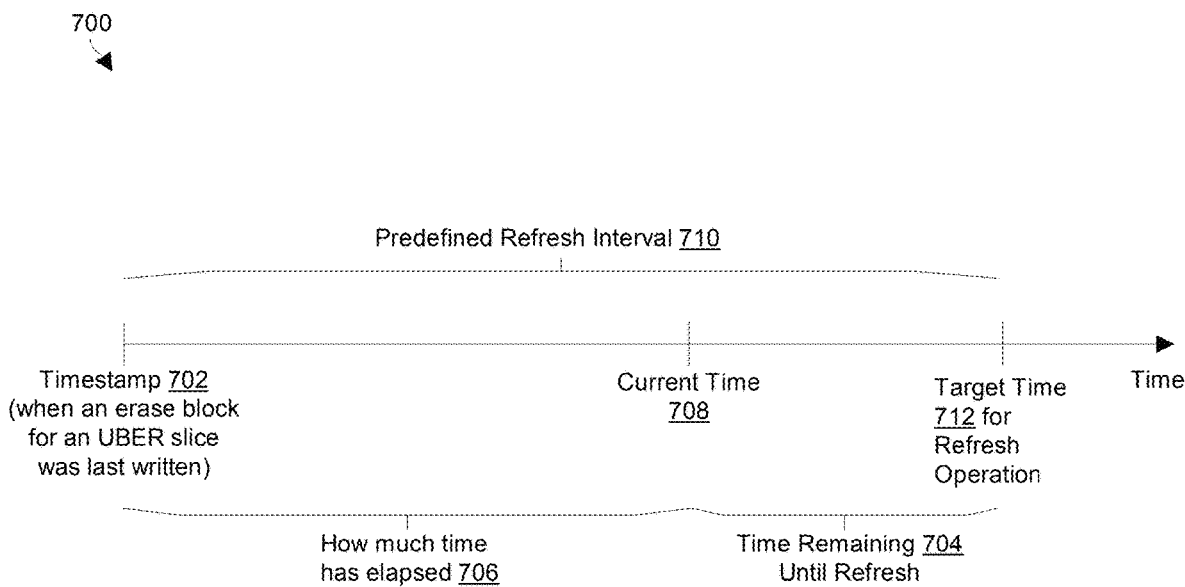
FIG. 7 is a timing diagram illustrating certain time details in accordance with certain embodiments.

FIGS. 6 and 7 show certain garbage collection details in accordance with certain embodiments. As shown in FIG. 6, the storage processing circuitry 142 provides, among other things, a system-level garbage collection service and maintains a garbage collection list 600 which is used by the system-level garbage collection service. As shown in FIG. 7, the garbage collection list 600 may be used to record, track and/or compute times for various events that occur on a timeline 700.

The garbage collection list 600 has slice entries 610(1), 610(2), 610(3), . . . 610(n) (collectively, slice entries 610) which identify (or correspond with) UBER slices 630 that currently store valid data for UBERs (e.g., see the UBER 310 in FIG. 3 and the UBER 410 in FIG. 4). In some arrangements, the slice entries 610 are ordered within the list 600. Along these lines, the slice entries 610 at the top 612 of the garbage collection list 600 are the oldest slice entries 610 (i.e., the slice entries 610 that have resided in the garbage collection list 600 the longest), and the slice entries 610 at the bottom 614 of the garbage collection list 600 are the newest slice entries 610 (i.e., the slice entries 610 that have been most recently added to the garbage collection list 600).

The slice entries 610 include various fields 620 including a slice identifier field 622, a timestamp field 624, a "time remaining until refresh" field 626, and other fields 628. The slice identifier fields 622 of the slice entries 610 are configured to store slice identifiers that uniquely identify UBER slices 630 corresponding to the slice entries 610. For example, the slice identifier field 622 of the slice entry 610(1) stores a slice identifier that identifies a first UBER slice, the slice identifier field 622 of the slice entry 610(2) stores a slice identifier that identifies a second UBER slice that is different from the first UBER slice, and so on.

The timestamp fields 624 of the slice entries 610 are configured to store timestamps indicating when the corresponding UBER slices 630 were last written. For example, when the storage processing circuitry 142 writes data to an UBER slice 630, the storage processing circuitry 142 places a timestamp 702 (e.g., see FIG. 7) into the timestamp field 624 of the corresponding slice entry 610 for that UBER slice 630 indicating the time that an erase block underlying the UBER slice 630 was written. As another example, when the system level garbage collection service empties, erases, and unmaps an UBER slice 630, the system level garbage collection service may place INVALID in the timestamp field 624 of the slice entry 610 for that UBER slice 630.

The "time remaining until refresh" fields 626 of the slice entries 610 are configured to store computed amounts of time remaining 704 before the UBER slices 630 corresponding to the slice entries 610 will be refreshed (e.g., by the internal FDP drive circuitry 520 identified in FIG. 5). The storage processing circuitry 142 may derive such amounts of time by first calculating how much time has elapsed 706 since the UBER slices 630 were written (e.g., subtracting the timestamps in the time stamp fields 624 from the current time 708), and then subtracting the time that has elapsed 706 from the periodic refresh interval 710 for the SSD storage. For the purposes of identifying UBER slices 630 for garbage collecting, the storage processing circuitry 142 may ignore slice entries 610 in which the timestamps are set to INVALID.

The other fields 628 are configured to contain other information for the UBER slices 630. For example, such other fields 628 may indicate which UBER is currently using the UBER slice 630, a measure as to how much of the UBER slice 630 contains valid data 630, and so on.

At this point, it should be understood that the storage processing circuitry 142 accesses the garbage collection list 600 at various times of operation. Along these lines, the storage processing circuitry 142 periodically updates the computed amounts of time remaining in the "time remaining until refresh" fields 626 of the slice entries 610 (e.g., every 10 minutes, every 15 minutes, etc.) as well as performs garbage collection based on the computed amounts of time remaining (e.g., source UBER slices 630 which will be refreshed within a predefined amount of time as indicated by the slice entries 610). Additionally, the storage processing circuitry 142 updates the timestamps within the slice entries 610 when the identified UBER slices 630 are written. Furthermore, the storage processing circuitry 142 may remove slice entries 610 from the garbage collection list 600 having timestamps set to INVALID and/or as the identified UBER slices 630 are written are garbage collected, erased and unmapped.

In some arrangements, the storage processing circuitry 142 is able to compute target refresh times 712 for the UBER slices 630 based on the amounts of time remaining 704 in the "time remaining until refresh" fields 626 of the slice entries 610. Along these lines, the target refresh times 712 may simply be the amounts of time remaining 712 added to the current time 708. If the storage processing circuitry 142 is able to perform system-level garbage collection on an UBER slice 630 before the target refresh time 712 for that UBER slice 630, the UBER slice 630 will be GC'd, emptied, and unmapped thus alleviating the need for the storage device 144 to refresh the erase block underlying that UBER slice 630.

In some arrangements, the system-level garbage collection service that is provided by the storage processing circuitry 142 accesses the list 600 to identify UBER slices 630 having amounts of time remaining less than a predefined threshold (e.g., by marking the corresponding slice entries 610 on the list 600). Additionally, the system-level garbage collection service garbage collects those identified UBER slices 630 (e.g., based on marked slice entries 610 on the list 600).

In accordance with certain embodiments, one or more of these list-accessing activities is performed by the system-level garbage collection service that is provided by the storage processing circuitry 142. Such a garbage collection service may run as a low priority service (e.g., transparently in the background) to enable higher priority activities such as performing read operations and write operations on behalf of hosts to be performed ahead of the garbage collection service.

It should be appreciated that the system-level garbage collection service may garbage collect UBER slices 630 just before the UBER slices 630 are about to be refreshed (e.g., based on the time information in the garbage collection list 600), as well as based on utilization of the UBER slices 630 (e.g., the emptiest UBER slices 630 based on the percentage of valid data within the UBER slices 630). Along these lines, the system-level garbage collection service may algorithmically decide on the amount of emphasis to place on garbage collecting poorly utilized UBER slices 630 (e.g., UBER slices 630 that only contain X % valid data where X is 40%, 30%, 25%, etc.). Accordingly, the system-level garbage collection service is able to strike a balance between garbage collecting (i) UBER slices 630 that are close to being internally refreshed but perhaps are not the emptiest and (ii) UBER slices 630 that are the emptiest in order to achieve predefined garbage collection efficiency targets.

As will be explained in further detail shortly, the storage processing circuitry 142 may operate in different modes depending on how busy (or how much I/O traffic) the storage processing circuitry 142 is currently processing. Along these lines, if the storage processing circuitry 142 is relatively idle (e.g., not running), the garbage collection service may be explicitly triggered to perform individual garbage collecting operations (e.g., specific UBER slices 630) just before the reclaim units (or erase blocks) for those slices 630 are about to be refreshed. Alternatively, if the storage processing circuitry 142 is somewhat busy, the garbage collection service may periodically perform garbage collecting operations on any UBER slices 630 which will be refreshed within a predefined amount of time (e.g., based on the "time remaining until refresh" for the slice entries 610).

As shown in FIG. 6, the garbage collection service performs garbage collection on one or more UBER slices 630 utilizing the garbage collection list 600. Along these lines, recall as explained above that the storage processing circuitry 142 has previously stored data within one or more erase blocks that provides the SSD storage for the one or more UBER slices 630. Accordingly, the UBER slices 610 within the garbage collection list 600 have been updated to reflect that the SSD storage is now configured to refresh the one or more erase blocks for the one or more UBER slices 610 at an upcoming target refresh time.

At 650, the storage processing circuitry 142 detects that an internal periodic refresh service operating within the SSD storage is currently configured to perform a refresh operation for an erase block that stores data for an UBER slice 630 at a target refresh time that is within an upcoming amount of time. Along these lines, the storage processing circuitry 142 accomplishes such detection based on a slice entry 610 for the UBER slice 630 in the garbage collection list 600. In some arrangements, activation of the storage processing circuitry 142 is triggered by the amount of time remaining until refresh dropping under a predefined threshold, the storage processing circuitry 142 periodically waking to provide the garbage collection service, combinations thereof, and so on.

At 660, the storage processing circuitry 142 performs, in response to detecting that the internal periodic refresh service is currently configured to perform a refresh operation for the erase block at the target refresh time that is within the upcoming amount of time, a system-level garbage collection operation on the data stored in the erase block. In particular, the storage processing circuitry 142 garbage collects the data from a source UBER slice 610 (e.g., UBER slice 610(S)) that is currently mapped to the erase block into a destination UBER slice 610 (e.g., UBER slice 610(D)). Ideally, the system-level garbage collection operation consolidates data from multiple UBER slices 610 and thus from multiple erase blocks that are about to be refreshed (e.g., two, three, etc.).

At 670, the storage processing circuitry 142 erases the one or more UBER slices 610 that were emptied by the garbage collection operation. Along these lines, the storage processing circuitry 142 erases the empty UBER slice on each of the FDP drives it was constructed from. As a result, the corresponding RUs on each of the drives will get fully erased, such that there is no need for the SSD to perform garbage collection (GC) or periodic refresh. That is, such operation prevents the internal periodic refresh service from performing a refresh operation for the erase block at the target refresh time which would otherwise unnecessarily reduce SSD storage endurance.

At 680, the storage processing circuitry 142 unmaps all UBER slices 630 that were garbage collected and updates the garbage collection list 600. In some arrangements, such updating involves the storage processing circuitry 142 removing the slice entries 610 corresponding to the garbage collected UBER slices 630 from the garbage collection list 600. In other arrangements, such updating involves the storage processing circuitry 142 setting (or recording) the timestamp of the unmapped UBER slices 630 to INVALID so that the garbage collection service or some other low priority/background service can later remove the corresponding slice entries 610.

It should be appreciated that the certain operations described above may be performed in a different order than that presented. For example, storage processing circuitry 142 may erase an UBER slice 630 before or after the storage processing circuitry 142 unmaps the UBER slice 630.

It should be further understood that other operations take place to keep the garbage collection list 600 updated. In some arrangements, the storage processing circuitry 142 routinely sorts (or ranks) the slice entries 610 in the garbage collection list 600 so that the system level garbage collecting service may perform system level garbage collection based on slice entries 610 from the top 612 of the list 600. In some arrangements, the storage processing circuitry 142 moves slice entries 610 identifying UBER slices 630 with high times remaining until refresh to the bottom (or end) 614 of the list 600. In some arrangements, the storage processing circuitry 142 adds slice entries 610 that have been fully written to the bottom 614 of the list 600. In some arrangements, the storage processing circuitry 142 removes slice entries 610 corresponding with UBER slices 630 that have been unmapped from the list 600.

It should be appreciated that a variety of techniques are suitable for determining when an UBER slice 630 is fully written. In such a situation, the storage processing circuitry 142 may add a corresponding slice entry 610 (i.e., a slice entry 610 identifying the fully written UBER slice 630 and having an updated timestamp) to the bottom of the list 600.

In some embodiments, the storage processing circuitry 142 maintains "size written" counters for the UBER slices 630 (also see the specialized code 224 and the other code and/or data 226 in FIG. 2). Since the storage processing circuitry 142 sets the UBER slice size to the RU size as mentioned earlier in connection with FIG. 3), the UBER slice 630 is full with the corresponding RU is full. Accordingly, the storage processing circuitry 142 is able to detect when an UBER slice 630 is fully written (e.g., it is when the "size written" counter for the UBER slice 630 reaches the UBER slice size).

In some embodiments, the storage processing circuitry 142 is able to query the storage devices 144 for various information (also see FIG. 1). Such querying abilities are richly and robustly available with FDP drives. Along these lines, the storage processing circuitry 142 periodically checks the storage devices 144 to determine fullness of the erase blocks (e.g., periodically querying FDP drives to obtain the remaining sizes of the current RUs). In the context of an FDP drive, when the remaining size of an RU reaches 0, or more precisely, increases compared to the result from previous query because the FDP drive switched to a new RU, the storage processing circuitry 142 determines that the previous RU is full. Further details will now be provided with reference to FIG. 7.

Figure 8:
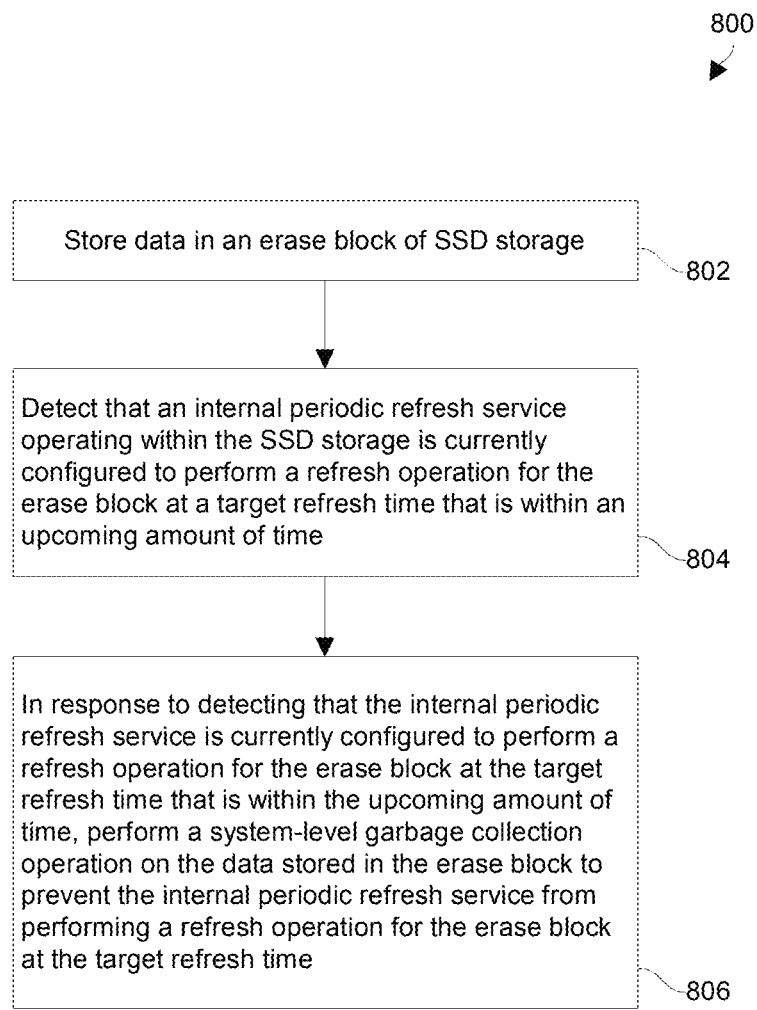
FIG. 8 is a flowchart of a procedure which provides endurance to SSD storage in accordance with certain embodiments.

FIG. 8 shows a procedure 800 which provides endurance to SSD storage in accordance with certain embodiments. Such a procedure may be performed by specialized circuitry within data storage equipment.

At 802, the specialized circuitry stores data in an erase block of the SSD storage. As mentioned earlier, suitable SSD storage may be provided by a set of FDP drives using QLC technology which performs refreshes at a predefined periodic interval.

At 804, the specialized circuitry detects that an internal periodic refresh service operating within the SSD storage is currently configured to perform a refresh operation for the erase block at a target refresh time that is within an upcoming amount of time.

At 806, the specialized circuitry performs, in response to detecting that the internal periodic refresh service is currently configured to perform a refresh operation for the erase block at the target refresh time that is within the upcoming amount of time, a system-level garbage collection operation on the data stored in the erase block to prevent the internal periodic refresh service from performing a refresh operation for the erase block at the target refresh time. By such configuration of the data storage equipment (e.g., updating the system-level garbage collection service) to be aware of the SSD periodic refresh, the data storage equipment improves the effective SSD endurance.

Further Details

As described above, improved techniques are directed to system-level garbage collecting data from erase blocks of SSD storage just before the erase blocks are to be internally refreshed. Such operation alleviates the need to internally refresh the erase blocks thus improving SSD storage endurance. Additionally, such operation simultaneously accomplishes system-level garbage collection (e.g., consolidating valid data into fewer erase blocks) thus improving storage efficiency and making erase blocks of the SSD storage available for future use. Flexible data placement (FDP) SSDs are well suited for forming the SSD storage since FDP SSDs support a rich and robust command set which provides external storage processing circuitry with the ability to identify (or specify) reclaim units (RUs) in which to write to using reclaim unit handles (RUHs).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be appreciated that an SSD supports a limited number of P/E (Program/Erase) cycles for each erase block. The limited number of NAND block writes defines the SSD endurance, which can be described by the Drive Writes Per Day (DWPD) value. This value indicates the supported number of full disk writes per day, over the warranty period for the SSD. The SSD endurance, expressed by the DWPD value, is directly proportional to the PE count.

The P/E count for QLC drives is much more limited than TLC drives, and their DWPD is significantly lower than TLC drives (e.g., 0.2 vs 1). QLC SSDs have less endurance than TLC SSDs for at least two main reasons:

1) More charge levels: QLC (Quad-Level Cell) flash memory stores 4 bits of data per cell, while TLC (Triple-Level Cell) stores 3 bits. Each additional charge level increases the complexity of storing and reading data accurately, making QLC cells more susceptible to wear and tear.

2) Smaller voltage gaps: The different voltage levels representing data in QLC cells are closer together than in TLC cells. This makes it more difficult to accurately distinguish between voltage levels, especially as the cell ages and accumulates electrical noise. This leads to a higher chance of errors and reduced endurance.

In addition, QLC drives reserve significant P/E counts for Periodic Refreshes, which is part of SSD retention management. Along these lines, the SSD periodically remaps data of erase blocks in order to avoid uncorrectable retention errors. For example, the SSD may rewrite data that was written to an erase block after a metric such as PR_PERIOD_DURATION (e.g., 4 days) since the erase block was written, if the host didn't overwrite/unmap all the corresponding LBAs during that time. The Refresh period is determined by the QLC device and is fixed.

Storage systems that manages data in (logical) blocks use garbage collection (GC) processes which merge partially utilized blocks (i.e., source blocks) and write them to available/free blocks (i.e., destination blocks), freeing the old ones.

If there was a mapping between the host (logical) blocks to the SSD erase blocks, such garbage collection processes could have preferred those that are about to be refreshed as source blocks for GC, unmap the corresponding logical block addresses (LBAs) after GC completion, and periodic refresh for those erase blocks could be avoided and P/E cycles could be saved. However, such mapping does not exist in standard SSDs.

The storage industry recently introduced FDP drives. These FDP drives define a RU (Reclaim Unit), which is a physical storage unit within the SSD, and which may include one or more erase blocks. The drive physical capacity is divided to multiple (fixed size) RUs, and the host is provided with additional/modified NVMe commands that allow it to direct data to different RUs, as well as to erase a complete RU.

Accordingly, as disclosed herein, methods are now able to leverage FDP to reduce the number P/E cycles associated with the SSD periodic refreshes, by updating the storage system GC to be aware of upcoming SSD periodic refreshes and therefore improve effective SSD endurance.

Consider a storage system composed of storage nodes which generally have CPU, memory and a DAE (Disk Array Enclosure) with SSD drives as the backend. The storage system may use a RAID5 or RAID6 parity protection scheme to store the user data. The RAID (redundant array of inexpensive disks) is organized in grids of fixed size blocks, with R rows and K+1 (RAID 5) or K+2 (RAID 6) columns called UBERs. Each column is a separate physical drive, and one (RAID5) or two (RAID6) columns are designated as parity. For RAID 6, for example, each UBER is constructed with a subset of K+2 drives (out of total N drives in the DAE); different UBERs may have different K+2 drives (also see FIGS. 3 and 4).

Each line in the UBER is called a PLB (Physical Large Block) which contains 2 MB of compressed data. For example, the 2 MB may be split between four drives 0 . . . 3, each stores 512 KB, and each parity drive stores 512 KB of parity, which means each line stores a total of 3 MB.

An UBER contains fixed capacity (e.g., 64 GB) of user data (excluding parity), and is constructed with fixed size slices of (e.g., 4 GB). Referring to the above example, an UBER with 4+2 (K=4) drives will have 4 slices on each drive (4 slices of 4 GB×4 data drives=4×4×4=64 GB of user data), while the total UBER capacity is 96 GB (including the 2 parity drives).

The storage system may use log-structured writes for the user data, e.g., by always writing full PLBs. When a data block within an existing PLB is overwritten, the new (compressed) data will be written (together with more new data) to a NEW (EMPTY) PLB (e.g., the existing PLB which held the old data is never modified—the updated block is only marked as invalidated).

The system uses a garbage collection (GC) process which merges partially utilized PLBs (i.e., source PLBs) and writes them to a new PLBs (i.e., destination PLBs), freeing the old partially used PLBs. As a result, the free PLBs are randomly spread in the drives, and therefore the storage system randomly writes to the SSDs.

The random-write performance of SSDs is much lower than sequential writes. The reason is that the SSD writes data in "erase block" units, which must be completely erased before they can be rewritten. Overwrites of data within an erase block always go to new erase block. When the overwrites leaves holes, the drive has much more load to free full erase blocks that can be erased and reused, as it needs to move data from one block to others (i.e., internal SSD Garbage Collection), which means performing more I/O operations (i.e., more reads and writes).

The excessive SSD GC causes not only performance degradation, but also accelerated wear of the SSD. That is, the SSD supports a limited number of P/E (Program/Erase) cycles for each erase block; therefore, the more GC is performed, the SSD needs to rewrite (P/E) more erase blocks.

Regarding SSD endurance and periodic refresh, the limited number of a NAND block writes defines the SSD endurance, which can be described by the Drive Writes Per Day (DWPD) value. This value indicates the supported number of full disk writes per day, over the warranty period.

For example, a drive may have a 1 DWPD over 5 years. The DWPD value may be calculated using the following formula:

$$DWPD = PE \times \frac{1+DP}{EOL \times W\lambda}$$

Where:
PE is the number of program/erase cycles of the NAND,
OP is the over provisioning,
EOL is total number of days for drive EOL (end of life), (typically 5 yrs×365.25), and
WA is the Write Amplification for the OP.

As depicted in the above formula, the SSD endurance, expressed by the DWPD value, is directly proportional to the PE count.

It should be noted that QLC drives have a much lower P/E count than TLC drives, and their DWPD is significantly lower than TLC drives (e.g., 0.2 vs 1). QLC SSDs have less endurance than TLC SSDs for two main reasons:
1) More charge levels: QLC (Quad-Level Cell) flash memory stores 4 bits of data per cell, while TLC (Triple-Level Cell) stores 3 bits. Each additional charge level increases the complexity of storing and reading data accurately, making QLC cells more susceptible to wear and tear.
2) Smaller voltage gaps: The different voltage levels representing data in QLC cells are closer together than in TLC cells. This makes it more difficult to accurately distinguish between voltage levels, especially as the cell ages and accumulates electrical noise. This leads to a higher chance of errors and reduced endurance.

In addition, a significant portion of the total P/E count of QLC drives (not included in the DWPD formula above) is reserved for periodic refreshes, which is part of the SSD retention management. The SSD periodically remaps data of erase blocks, in order to avoid uncorrectable retention errors. For example, the SSD may rewrite data that was written to an erase block after PR_PERIOD_DURATION (e.g., 4 days) since it was written, if the host didn't overwrite/unmapped all the corresponding LBAs during that time. The refresh period is determined by the QLC device and is fixed.

For example, consider SSD drive with P/E=2000, and DWPD=0.2, where additional 1000 P/E cycles (not included in the 2000), are accounted for periodic refreshes.

If there was a mapping between the host slices to the SSD erase blocks, the storage system could have preferred those that are about to be refreshed as source for GC, unmap the corresponding LBAs after GC completion, and the periodic refresh for those erase blocks could have been avoided and P/E cycles could have been saved.

Following the previous example, if the periodic refreshes could have been avoided completely, those 1000 P/E cycles could be used for host writes and improve the DWPD to 0.3.

However, such mapping does not exist in standard SSDs.

The storage industry recently introduced FDP (Flexible Data Placement) drives. FDP is a new NVMe (non-volatile memory express) specification that aims to improve the performance and efficiency of SSDs. These drives define a RU (Reclaim Unit), which is a physical storage unit within the SSD, and may include one or more erase blocks. The drive physical capacity is divided to multiple (fixed size) RUs, and the host is provided with additional/modified NVMe commands that allow it to direct data to different RUs, as well as to erase a complete RU. It does this by allowing the host to provide hints to the SSD controller about where to place data of the flash memory.

In accordance with certain embodiments, certain methods leverage FDP to reduce the number P/E cycles associated with the SSD periodic refreshes, by updating the storage system GC to be aware of the SSD periodic refresh and therefore improve the effective SSD endurance.

As QLC drives become more cost-effective with higher capacities, the motivation for finding ways to improve its endurance is increased.

As disclosed herein, certain embodiments are directed to techniques for improving the effective SSD endurance in storage system with FDP drives. Such techniques reduce wear and extend the lifetimes of the underlying SSD storage.

In accordance with certain embodiments, a storage system uses FDP drives natively by setting the UBER slice size to the FDP RU size, as well as updating its system-level GC service to operate in UBER slice granularity i.e., to clean UBER slices instead of PLBs. The storage system GC will empty an entire UBER slice, after which it will erase the empty UBER slice on each of the drives it's constructed from. As a result, the corresponding RUs on each of the drives will get fully erased, such that there is no need for the SSD to perform GC or periodic refresh.

Further to such embodiments, the storage system "slice" may be mapped to a physical RU. Each slice is a contiguous range of the drive LBAs (Logical Block Addressing) within a drive. Therefore, the mapping of the slice to a physical RU in practice is achieved by writing to its addresses range with the same RU handle. As part of the write command in FDP drives, the storage system provides a Reclaim Unit Handle Identifier (RUHI), such that the SSD will not mix in the same RU writes with different RU handles. Writes with the same RU handle will be written to the same physical RU until it is exhausted, at which point the SSD will point the RUH to a new empty RU.

In some embodiments, the storage system maintains a WriteTimestamp for each slice, indicating the time the slice was filled. The WriteTimestamp is set when the SSD switches RU. Since the slice is set to the RU size, the WriteTimestamp is set when the slice is fully written. The WriteTimestamp is set to INVALID on init, and when it is unmapped after being GC'ed.

It should be appreciated that the WriteTimestamp enables the storage system to calculate the next periodic refresh time for the corresponding UBER slice (also see FIG. 7). In practice,
a. PRInterval=Periodic_Refresh Interval
b. The time passed since last refresh is: TimeSinceLastPR=(CurrTimestamp−WriteTimestamp)modulo PRInterval.
c. TimeToNextRefresh=PRInterval−TimeSinceLastPR.

The refresh period "PRInterval" is determined by the QLC device and is fixed. This value may be reported by the drive or alternatively may be characterized in advance by the host (e.g., prefilling the entire drive and monitoring the endurance).

It should be understood that the system GC service may not always have an opportunity to garbage collect the slice in which the SSD will internally perform a periodic refresh of the slice at the PRInterval (if the system GC service did process the slice, then the slice was clean after GC and its WriteTimestamp would be set to INVALID). Accordingly, in a situation in which the SSD performs periodic refresh, the use of modulo enables the system GC service to calculate time for the next refresh.

In some arrangements, the storage system maintains the UBER slice identifiers in a sorted list, where the UBER slice with the lowest TimeToNextRefresh will be at the top. This list will be updated:
  a. Periodically every TTNR_LIST_UPDATE_INTERVAL, e.g., 10 minutes.
  b. After UBER slice is fully written.
  c. After UBER slice is GC'ed and unmapped.

Such updating may be performed by a variety of system components. For example, the list is updated when a slice entry is added to the list during a write operation that results in a "size written" counter reaching the slice size indicating that the slice is fully written or in response to querying an FDP drive and detecting that the previous RU is now full. As another example, the list is updated when a slice is GC's and emptied (i.e., the slice entry is then removed from the list). As yet another example, another component/service may update the information within the list periodically, and so on.

Slices that were refreshed since the last update will have a high TimeToNextRefresh and will be moved to the end of the list. Slices which were fully written will be added to the end of the list as well. Slices which where unmapped will be removed from the list, as they are never refreshed.

The GC algorithm for picking the source slices to clean will be updated to take into account periodic refreshes, in addition to current metrics such as picking the emptiest slice. Generally, GC picks the emptiest slice for efficiency reasons i.e., to move as little data as possible. Preferring to GC slices that are close to refresh but are not the emptiest may impact the GC efficiency and the system performance. Therefore, we propose the following method, according to the system state:

Idle state: when GC is not running (i.e., non-aggressive policy), GC will be explicitly triggered, to handle specific slices when they are close to refresh time, since otherwise a P/E cycle will be wasted. The GC will be periodically triggered, and if there are slices with TimeToNextRefresh less than a predefined threshold, they will be GC'ed.
  Other states: the GC will prefer slices closest to refresh, when both following conditions are met:
    a. their TimeToNextRefresh is below a predefined threshold GC_REFRESH_TIME_LIMIT. This condition it required to avoid unnecessary impact on GC efficiency in cleaning slices that are far from being refresh.
    b. their capacity utilization compared to the emptiest is below a predefined threshold GC_EFFICIENCY_GAP_LIMIT. This condition makes sure the GC efficiency impact is limited.

In some embodiments, the storage system sets different values to the GC_REFRESH_TIME_LIMIT and GC_EFFICIENCY_GAP_LIMIT thresholds, according to the system utilization state. For example, different values for LOW, MEDIUM, HIGH system utilization states. The GC_REFRESH_TIME_LIMIT will be lower for higher system utilization states, so that when the system is highly utilized, GC will prefer slices that are very close to refresh. Similarly, the GC_EFFICIENCY_GAP_LIMIT will be lower for higher system utilization states, to prefer slices close to refresh over emptiest, only if the GC efficiency impact is very limited (vs choosing based on the emptiest). The actual definition of system utilization is out of scope for this disclosure.

As described above, certain techniques leverage FDP drives to avoid periodic refreshes and improve the system SSDs endurance.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Moreover, it should be understood that QLC SSDs were described above as being suitable for use. However, other SSD technologies are also suitable for use such as TLC SSDs and SSDs having densities higher than QLC SSDs developed in the future. Such modifications and enhancements are intended to belong to various embodiments of the disclosure.

What is claimed is:

1. A method of providing endurance to solid stated device (SSD) storage, the method comprising:
   storing data in an erase block of the SSD storage;
   detecting that an internal periodic refresh service operating within the SSD storage is currently configured to perform a refresh operation for the erase block at a target refresh time that is within an upcoming amount of time; and
   in response to detecting that the internal periodic refresh service is currently configured to perform a refresh operation for the erase block at the target refresh time that is within the upcoming amount of time, performing a system-level garbage collection operation on the data stored in the erase block to prevent the internal periodic refresh service from performing a refresh operation for the erase block at the target refresh time.

2. The method of claim 1 wherein storing the data in the erase block includes:
   writing the data from storage processing circuitry which is external to the SSD storage into an UBER slice which maps to the erase block of the SSD storage.

3. The method of claim 2 wherein the internal periodic refresh service is configured to periodically perform refresh operations for erase blocks of the SSD storage according to a predefined refresh interval; and
   wherein detecting that the internal periodic refresh service is currently configured to perform a refresh operation for the erase block at the target refresh time that is within the upcoming amount of time includes:
      computing a time difference between a time in which the erase block was last written and a current time, and
      based on the time difference and the predefined refresh interval, detecting that an amount of time remaining in a current refresh interval before the target refresh time is less than a predefined threshold.

4. The method of claim 3 wherein performing the system-level garbage collection operation on the data includes:
   emptying the data from the UBER slice before the amount of time remaining in the current refresh interval passes to reconfigure the internal periodic refresh service to avoid performing a refresh operation for the erase block at the target refresh time.

5. The method of claim 4 wherein emptying the data from the UBER slice before the amount of time remaining in the current refresh interval passes includes:
   providing a set of commands from the storage processing circuitry to the SSD storage to relocate the data from the erase block of the SSD storage to one or more other erase blocks of the SSD storage.

6. The method of claim 5 wherein emptying the data from the UBER slice before the amount of time remaining in the current refresh interval passes further includes:
   deallocating logical block addresses associated with the UBER slice to unmap the UBER slice, and mapping one or more other UBER slices which map to the one or more other erase blocks to enable the storage processing circuitry to maintain access to the data that has been relocated to the one or more other erase blocks.

7. The method of claim 2 wherein the storage processing circuitry is constructed and arranged to manage a garbage collection list having slice entries corresponding to UBER slices; and
   wherein the method further comprises:
      recording a timestamp in a slice entry of the garbage collection list in response to writing the data from storage processing circuitry into the UBER slice which is currently mapped to the erase block of the SSD storage, the slice entry corresponding to the UBER slice.

8. The method of claim 7 wherein detecting that the internal periodic refresh service is currently configured to perform a refresh operation for the erase block at the target refresh time that is within the upcoming amount of time includes:
   computing, as a time-to-next-refresh value for the slice entry of the garbage collection list, a time difference between the timestamp in the slice entry of the garbage collection list and the target refresh time, and
   detecting that the time-to-next-refresh value is less than a predefined threshold.

9. The method of claim 8 wherein performing the system-level garbage collection operation on the data stored in the erase block includes:
   initiating the system-level garbage collection operation in response to detecting that the time-to-next-refresh value is less than the predefined threshold.

10. The method of claim 9 wherein a system-level garbage collection service provided by the storage processing circuitry is currently running, the system-level garbage collection service being configured to garbage collect UBER slices based on marked slice entries of the garbage collection list; and
    wherein initiating the system-level garbage collection operation includes:
       discovering that the time-to-next-refresh value is less than the predefined threshold in response to the system-level garbage collection service accessing the slice entry of the garbage collection list.

11. The method of claim 9 wherein a system-level garbage collection service provided by the storage processing circuitry is initially inactive, the system-level garbage collection service being configured to garbage collect UBER slices based on marked slice entries of the garbage collection list; and
    wherein initiating the system-level garbage collection operation includes:
       triggering activation of the system-level garbage collection service in response to the time-to-next-refresh value being less than the predefined threshold.

12. The method of claim 8, further comprising:
    computing, as time-to-next-refresh values for other slice entries of the garbage collection list, time differences between timestamps in other slice entries of the garbage collection list and other target refresh times, and
    detecting that at least some of the time-to-next-refresh values are less than the predefined threshold.

13. The method of claim 12, further comprising:
    initiating other system-level garbage collection operations in response to detecting that at least some of the time-to-next-refresh values are less than the predefined threshold.

14. The method of claim 13 wherein a system-level garbage collection service provided by the storage processing circuitry is currently running, the system-level garbage collection service being configured to garbage collect UBER slices based on marked slice entries of the garbage collection list; and
    wherein initiating the other system-level garbage collection operation includes:
       discovering that the other time-to-next-refresh values are less than the predefined threshold in response to the system-level garbage collection service accessing the other slice entries of the garbage collection list.

15. The method of claim 2 wherein the storage processing circuitry is constructed and arranged to manage a garbage collection list having slice entries corresponding to UBER slices; and
    wherein the method further comprises:
       periodically updating the garbage collection list to identify UBER slices for garbage collecting.

16. The method of claim 15, further comprising:
    updating the garbage collection list in response to UBER slices being fully written.

17. The method of claim 15, further comprising:
    updating the garbage collection list in response to UBER slices being garbage collected and unmapped.

18. Data storage equipment, comprising:
    solid stated device (SSD) storage;
    control circuitry memory; and
    control circuitry coupled to the SSD storage and the control circuitry memory, the control circuitry memory storing instructions which, when carried out by the control circuitry, cause the control circuitry to perform a method of:
       storing data in an erase block of the SSD storage,
       detecting that an internal periodic refresh service operating within the SSD storage is currently configured to perform a refresh operation for the erase block at a target refresh time that is within an upcoming amount of time, and
       in response to detecting that the internal periodic refresh service is currently configured to perform a refresh operation for the erase block at the target refresh time that is within the upcoming amount of time, performing a system-level garbage collection operation on the data stored in the erase block to prevent the internal periodic refresh service from performing a refresh operation for the erase block at the target refresh time.

19. A computer program product having a non-transitory computer readable medium which stores a set of instructions to provide endurance to solid stated device (SSD) storage; the set of instructions, when carried out by computerized circuitry, causing the computerized circuitry to perform a method of:
    storing data in an erase block of the SSD storage;
    detecting that an internal periodic refresh service operating within the SSD storage is currently configured to perform a refresh operation for the erase block at a target refresh time that is within an upcoming amount of time; and in response to detecting that the internal periodic refresh service is currently configured to perform a refresh operation for the erase block at the target refresh time that is within the upcoming amount of time, performing a system-level garbage collection operation on the data stored in the erase block to prevent the internal periodic refresh service from performing a refresh operation for the erase block at the target refresh time.

* * * * *